United States Patent [19]

Cull et al.

[11] 4,085,195

[45] Apr. 18, 1978

[54] SORBENT PREPARATION AND PROCESS USING SAME

[75] Inventors: Neville L. Cull, Baker; Lloyd A. Pine, Baton Rouge, both of La.; Dale D. Maness, Austin, Tex.

[73] Assignee: Exxon Research & Engineering Co., Linden, N.J.

[21] Appl. No.: 476,669

[22] Filed: Jun. 5, 1974

Related U.S. Application Data

[62] Division of Ser. No. 291,908, Sep. 25, 1972, Pat. No. 3,985,682.

[51] Int. Cl.$^2$ .......................... B01J 8/00; C01B 17/00
[52] U.S. Cl. .................................................. 423/244
[58] Field of Search ................................ 423/242–244; 252/465, 463

[56] References Cited

U.S. PATENT DOCUMENTS

| | | | |
|---|---|---|---|
| 2,746,936 | 5/1956 | Plank | 252/465 |
| 3,501,897 | 3/1970 | Van Helden et al. | 423/244 |
| 3,840,643 | 10/1974 | Martin | 423/244 |

FOREIGN PATENT DOCUMENTS 1,283,737    8/1972    United Kingdom.

*Primary Examiner*—O. R. Vertiz
*Assistant Examiner*—Gregory A. Heller

[57] ABSTRACT

Process for preparing surface impregnated catalysts and sorbents, and flue gas desulfurization process using the same. The sorbent is produced by pre-soaking a porous solid particulate carrier material in a polar organic liquid such as a $C_5$–$C_{10}$ alcohol, immersing the carrier without drying in an impregnating solution for a time sufficient to permit the impregnating solution to penetrate to a controlled depth without totally impregnating the carrier, and drying and calcining the impregnated carrier, whereby a contact material having an inner zone of substantially unimpregnated carrier and an outer zone of carrier impregnated with active material is produced. Sulfur dioxide is removed from flue gas by contacting the flue gas with a sorbent thus prepared. The preferred carrier for flue gas desulfurization is alumina and the preferred active material is copper oxide.

7 Claims, 2 Drawing Figures

SORBENT PREPARATION AND PROCESS USING SAME

This application is a division of U.S. application Ser. No. 291,908 which was filed Sept. 25, 1972 and which is now U.S. Pat. No. 3,985,682.

BACKGROUND OF THE INVENTION

This invention relates to processes for making surface impregnated solid catalysts and sorbents, and to flue gas desulfurization processes using a surface impregnated sorbent.

Sulfur dioxide is a constituent of various waste gases. Among these are flue gas formed by the combustion of fossil fuels, off gases from various chemical and petroleum refining processes, and smelter gases. A major source of sulfur dioxide pollution of the atmosphere is flue gas from electric power plants. Such flue gas typically contains about 0.2 to about 0.3% by volume of sulfur dioxide, trace amounts of sulfur trioxide, some oxygen (i.e., about 1 to 4% by volume) due to the use of excess air in combustion and about 10 to 15% of carbon dioxide. Because of the harmful effects of sulfur dioxide, it is highly desirable that the discharge of sulfur dioxide into the atmosphere be held to a low level.

It is known that sulfur dioxide can be removed from flue gas by contacting the flue gas with a suitable solid sorbent comprising an active material for the selective removal of $SO_2$ on a porous carrier. The active material is generally metal or metal oxide, such as copper or copper oxide, or a potassium oxide-vanadium pentoxide mixture, and the porous carrier is generally an essentially inert solid refractory material such as alumina, silica, and the like. Flue gas desulfurization processes using sorbents of this type are described, for example, in British Pat. No. 1,089,716 and in U.S. Pat. No. 3,501,897.

The active material in the usual flue gas desulfurization sorbent is uniformly distributed throughout the carrier particles. Such sorbents are typically produced by impregnating the porous carrier material with a solution of a salt which is decomposable to the desired active material (usually a metal oxide), and then calcining. Desulfurization is accomplished by passing flue gas containing sulfur dioxide through a bed of the sorbent until the amount of $SO_2$ in the effluent reaches a predetermined level, e.g., 10% of the amount of $SO_2$ in the entering gas, then regenerating the sorbent with a reducing gas.

The active material of the sorbent ordinarily is not completely utilized. That is, when the sulfur dioxide content in the effluent gas reaches the predetermined level, there is still unconverted metal oxide in the sorbent. One reason for this is that sulfur dioxide penetrates to the core of the sorbent particles only to a limited degree. The present invention provides a flue gas desulfurization process which uses a sorbent in which the active material is predominantly in an outer zone of the carrier particles near the external surface thereof. This permits more efficient utilization of the active material.

Processes for producing surface impregnated porous solid contact materials are known. The term "solid contact material" in this connection is used to denote both catalysts and solid sorbents. The term "surface impregnated" refers to solid contact materials comprising a particulate porous solid carrier and an active material which is disposed predominantly near the external surfaces of the carrier particles rather than uniformly throughout the carrier particles. Materials of this type are described, for example, in U.S. Pat. No. 2,746,936 and in British Pat. No. 642,970.

U.S. Pat. No. 2,746,936, for example, discloses the preparation of impregnated catalysts by partially filling the pores of the carrier with an inert blocking liquid, and then impregnating the carrier material with an impregnating solution, drying, and decomposing the impregnating solution solute (usually a metal salt) into the desired catalytically active material. Partial filling of the pores by the blocking liquid may be achieved in various ways, e.g., by evacuating the carrier material and using a quantity of blocking liquid which is less than the pore volume of the carrier, or by immersing the carrier in the blocking liquid for a length of time which results in partial rather than total filling of the pores of the carrier. The final catalyst is a particulate material in which the active catalytic material is located predominantly in the outer portion of the carrier material. Various carriers and various active materials can be used. The catalysts are disclosed as useful in catalytic cracking and other hydrocarbon conversion processes. A disadvantage of this process is that procedures for partially blocking the carrier pores suggested in this reference do not lend themselves readily to large scale operations.

British Pat. No. 642,970 discloses that catalyst particles having a greter concentration of active material near the surface than near the center can be obtained by uniformly soaking the particles in an impregnating solution and then rapidly drying the particles at 150°-200° C.

It is also possible to produce surface impregnated solid contact materials by spray coating calcined porous carrier particles with an impregnating solution containing the desired active material while tumbling, and then drying and calcining the impregnated carrier particles. The depth of impregnation tends to be variable, particularly when the carrier particles are in shapes that have inside surfaces such as Raschig rings, and there is no clear-cut line of demarcation between the impregnated outer zone and the substantially unimpregnated center core.

SUMMARY OF THE INVENTION

According to the present invention, sulfur dioxide is removed from a waste gas such as flue gas by contacting the gas with a porous granular solid sorbent comprising a carrier and an active material which is deposited on the carrier predominantly in an outer zone adjacent to the external surface thereof. The sorbent is prepared by immersing the carrier material in a polar organic presoak liquid, separating the carrier from the presoak liquid and, without drying, immersing the carrier in an impregnating solution containing a dissolved compound which is decomposable into a desired active material, drying the carrier and converting the decomposable compound into the desired active material, thereby producing a sorbent comprising a porous carrier and an active material which is deposited predominantly in an outer zone adjacent to the external surface of the carrier.

THE DRAWINGS

DESCRIPTION OF THE PREFERRED EMBODIMENT

Figure 1:
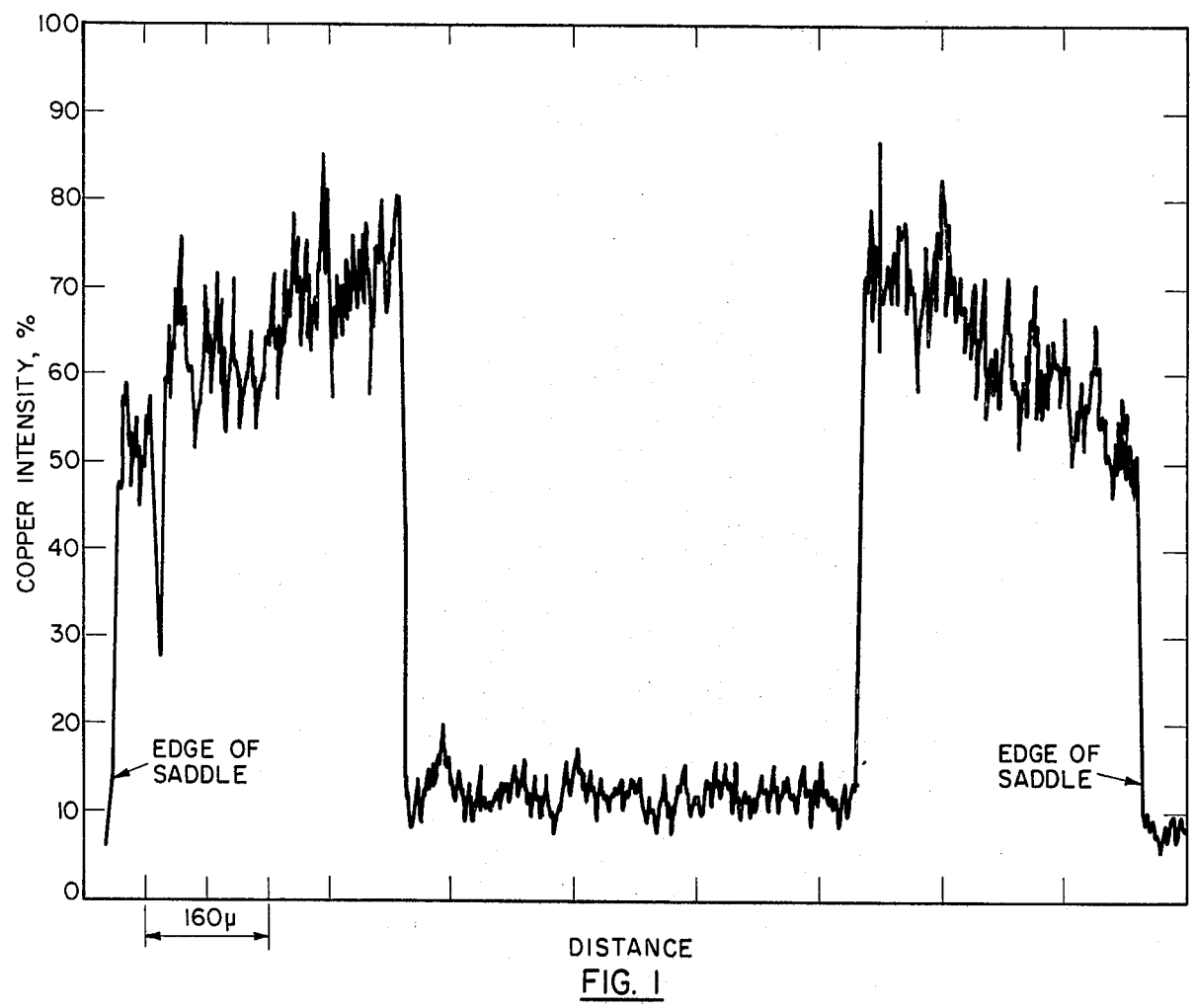
FIG. 1 is a copy of an electron probe tracing showing the variations in copper concentration along a straight line extending from one edge to the opposite edge of a surface-impregnated sorbent particle prepared according to this invention.

This invention will be described with particular reference to a preferred embodiment thereof, i.e., to a flue gas desulfurization process using a surface impregnated copper oxide on alumina sorbent, and to a novel method of making the surface impregnated sorbent. It will be apparent from the description, however, that the sorbent preparation techniques to be described herein are applicable generally to the preparation of porous granular solid contact materials, both catalysts and sorbents, comprising a porous carrier material and an active material which is deposited predominantly in an outer zone of the carrier near the external surface thereof.

The carrier material which can be used in the preparation of catalysts and sorbents according to this invention are porous materials in granular or particulate form. The materials are inorganic refractory substances, which are preferably hydrophilic so that they can be wetted by polar organic liquids and by aqueous impregnating solutions. Typical carrier materials include alumina, silica, silica-alumina, titania, titania-alumina, alumina-zirconia, alumina-thoria, bauxite, magnesia, and the like. Alumina is a preferred carrier material for the preparation of flue gas desulfurization sorbents, and for other catalysts and sorbents as well.

The carrier according to the present invention is in the form of particles or grains in any desired shape. Conventional shapes such as spheres and cylindrical extrudates can be used. However, best results are obtainable when the carrier particle is a more irregular shape, such as Raschig rings or Intalox saddles, the latter being shown and described in U.S. Pat. Nos. 2,639,909 and 3,060,503. These irregular shapes are preferred because packed beds of these shapes have a higher void volume with resultant lower pressure drop than packed beds of more conventional shapes such as spheres and cylinders. The carrier materials can be formed into particles of desired shape by known techniques such s extrusion.

The shaped carrier particles which are used in the present invention are characterized by a high surface area, generally over 100 square meters per gram, which is due to an internal pore structure. This internal pore structure is well known in the art.

According to the present invention, the carrier particles prior to impregnation are immersed in a polar organic presoak liquid for a time sufficient to fill substantially completely the pores of the carrier. By filling the pores of the carrier, the presoak liquid prevents total impregnation of the carrier particles. The quantity of presoak liquid is, of course, greater than the total pore volume of the carrier being immersed. The total pore volume of the carrier particles being immersed is computed by multiplying the unit pore volume (i.e. cc/gram) by the quantity (in grams) of carrier material. Immersion times of about 10 minutes are sufficient in most cases to permit the presoak liquid to displace the air in the carrier pores and to fill the pores completely; much shorter times frequently are sufficient. Preferred presoak times are in the range of about 10 minutes to about 2 hours; longer times are permissible. Immersion temperatures ordinarily can range from the freezing point to the boiling point of the presoak liquid. Room temperature (about 25° C. or 77° F.) is quite desirable in most cases. Lower temperatures increase the viscosity of the presoak liquid and thereby reduce the rate of displacement of the presoak liquid by the impregnating solution.

The presoak liquid must be capable of wetting the carrier material. Carrier materials, such as sponge metals, which are not easily wet, and nonwetting liquids such as mercury, are usually avoided. The presoak liquid must also be capable of displacement by the impregnating solution at a rate slow enough to permit control of the depth of impregnation. Other criteria which are desirable in a presoak liquid are: (a) chemical stability; (b) immiscibility or only slight miscibility with the impregnating solution (to facilitate recovery of the presoak liquid following impregnation); and (c) a volatility lower than that of water but not so low as to hamper its removal during the drying and calcination steps.

Aliphatic alcohols containing from 5 to 10 carbon atoms and particularly primary aliphatic $C_5$-$C_{10}$ monohydric alcohols, are preferred presoak liquids. Pentanol-1 is a preferred presoak liquid. An isomeric mixture composed predominantly of primary aliphatic monohydric $C_6$ alcohols, commonly known as "oxo alcohol", is another preferred presoak liquid. An isomeric mixture composed predominantly of primary aliphatic monohydric $C_8$ alcohols, which is also commonly called "oxo alcohol", is also a good presoak liquid. Normal decyl alcohol can also be used, but is more slowly displaced than the lower alcohols because of its greater viscosity. In general, the $C_4$-$C_{12}$, and especially the $C_5$-$C_{10}$, alcohols are good organic presoak liquids. Other classes of organic compounds can also be used as presoak liquids. These include esters such as ethyl acetate; aldehydes such as propional, furfural, and 2-ethyl-hexanal; and nitriles such as adiponitrile and acetonitrile (hexanenitrile is not suitable). Water miscible organic acids such as acetic acid are useful in cases when a slow penetration rate is desired. Water immiscible organic acids, on the other hand, are displaced extremely slowly and are not suitable. Water miscible ketones such as acetone and methyl ethyl ketone may be used but hexanone-2 gave less desirable results. Water soluble alcohols, e.g., methanol, ethanol and particularly isopropanol and glycols, e.g., ethylene glycol, may also be used. Amines in general are not suitable, particularly when an aqueous solution of a metal salt is used to displace the amine. For example, with an aqueous copper impregnating solution, precipitation of the copper occurs in the dip solution. Formamide also was not suitable, being too rapidly displaced.

Although the above-named classes of organic compounds can be used as presoak liquids, other factors may preclude their use. For example, aldehydes are difficult to keep in a pure state and may oxidize to acids which are not suitable for the purposes of this invention. Furfural also may resinify on drying and be difficult to remove from the alumina. Water solubility of the presoak liquid in the impregnating salt solution is also undesirable from the standpoint of recovery and recycle of both the presoaking liquid and the impregnating salt solution. Volatility of the presoak liquid, if higher than water, may cause problems in the drying step. Also, the question of cost would preclude the actual use of many of these compounds as presoak liquids in large scale operations.

Hydrocarbons and halogenated hydrocarbons, both aliphatic and aromatic, should be avoided. The hydrocarbons and halogenated hydrocarbons are very rapidly displaced by aqueous impregnating solutions; in fact, so rapidly that they give essentially no control over the depth of impregnation. This is attributed to the fact that the hydrocarbons are nonpolar liquids, and therefore have little or no affinity for the usual carrier materials. This results in their rapid displacement by the impregnating solution.

The above-named presoak liquids have been found particularly desirable when alumina is the carrier material. There is some variability in the choice of presoak liquids depending on the choice of carrier material, since the readiness with which a presoak liquid is displaced by the impregnating solution is governed in large measure by the degree of interaction between the presoak liquid and the carrier material, which in turn is influenced by the chemical properties of both presoak liquid and carrier.

The carrier particles are separated from the presoak liquid by any desired means, e.g., removal of the carrier particles from the body of liquid, or draining of the presoak liquid from its container. At this point the pores of the carrier are completely filled with presoak liquid, and some excess liquid may be dragged out of the container of presoak liquid by the carrier. The excess liquid may be drained or blotted from the carrier if desired, although this is not necessary. However, it is essential that the carrier not be dried at this stage. The carrier, without drying, is immersed in the impregnating solution. The impregnating solution contains, as its solute, a compound which is decomposable into the desired active material. Thus, for example, in the case of flue gas desulfurization sorbents where the desired active material is copper oxide, a copper salt such as copper nitrate may be used as the solute. Where the desired active material is another active material, e.g., iron, cobalt, nickel, vanadium, chromium, zinc, cadmium, platinum or palladium, or a compound (usually an oxide) thereof, a decomposable salt of the desired metal is chosen as the solute of the impregnating solution. Ferric nitrate, cobalt nitrate, nickel nitrate, platinum chloride, and palladium chloride are examples of suitable decomposable salts. In general, the desired active material is a metal, a metal oxide, or a mixture of metals or metal oxides, and the solute or decomposable compound is correspondingly a metal salt or a mixture of metal salts. Suitable decomposable metal salts yielding virtually any desired metal oxide are known in the art. The solvent of the impregnating solution is usually water, which has the advantages of low cost, high affinity for the usual carrier materials, and immiscibility or partial immiscibility with a large number of organic liquids which are suitable as presoak liquids. Thus, the preferred impregnating solutions are aqueous solutions. However, solvents other than water may be used where desired, provided the desired decomposable compound is soluble therein, and further provided that the chosen solvent is capable of displacing the presoak liquid at a controlled rate. Suitable nonaqueous solvents include methanol, ethanol, isopropyl alcohol, dimethyl sulfoxide, and acetonitrile.

The impregnating solution partially displaces the presoak liquid from the pores of the carrier at a controlled rate. The impregnating solution permeates the particles of carrier from the external surface of each particle toward the center. The impregnating solution displaces the presoak liquid as it penetrates deeper into a particle. The presoak liquid blocks access by the impregnating solution to the centers of the particles, so that an inner core of substantially unimpregnated carrier remains in each particle when the impregnation is complete. The time of impregnation is important, but varies widely depending on the depth of impregnation desired, and the carrier and the presoak liquid. Hence, the desirable length of impregnation is best determined experimentally using small batches of presoaked carrier. A fairly uniform depth of impregnation is achieved, even when a particle of irregular shape such as a saddle or a Raschig ring is used. In the preparation of flue gas desulfurization sorbents, particularly copper oxide on alumina sorbents, it is generally desirable to impregnate about 10% to about 60%, preferably 10—30%, of the total carrier volume. The depth of impregnation corresponding to any desired volume percentage impregnation can be readily calculated from the geometry of the particle. When impregnation is incomplete, the particle has an inner core of substantially unimpregnated carrier, surrounded by an outer zone of impregnated carrier adjacent to the external surface of the particle. The impregnated carrier material is separated from the impregnating solution when the desired depth of impregnation is achieved.

Some presoak liquid is carried into the impregnating solution by the carrier particles. Separation of the two liquids can be achieved by decantation when the two liquids are immiscible or substantially immiscible in each other. Hence substantially water-immiscible presoak liquids are preferred when aqueous impregnating solutions are used. The water-immiscible presoak liquid can be decanted continuously from the impregnating solution, or the impregnating solution can be periodically replaced by fresh solution and then decanted to remove presoak liquid.

The impregnated carrier material is dried and the decomposable compound is converted to the desired active material. Usually, drying and decomposition are separate operations, since most decomposable compounds will not decompose under normal drying conditions. Calcination in an air atmosphere is a preferred means of decomposing most decomposable compounds into the desired active materials. thus, for example, a copper salt such as copper nitrate may be converted into copper oxide by heating the carrier particles to a temperature of about 700° F. to about 1200° F., preferably 800°–1000° F., in the presence of air for from 1 to 6 hours, preferably about 3 hours.

The final product solid contact material comprises an inner core of substantially unimpregnated porous carrier, surrounded by an outer zone of porous carrier having the active material deposited on the internal surface or pore walls of the carrier material. This outer zone is adjacent to the external surface of the carrier. Stated another way, the product solid contact material comprises a porous carrier having an active material distributed predominantly in the outer portion thereof.

In the case of preferred flue gas desulfurization sorbents, this finished product is porous alumina having a substantially unimpregnated inner core and an outer zone, which comprises about 10% to about 60% of the total carrier volume, which is impregnated with copper oxide. The overall copper concentration is in the range of about 0.5% to about 6% by weight, preferably about 1% to about 4% by weight. The copper concentration in the impregnated outer layer is about 2% to about 10% by weight, preferably about 4% to about 6% by weight, which is about the same as the optimum overall copper concentration in fully impregnated flue gas desulfurization sorbents.

Flue gas desulfurization sorbents comprising vanadium pentoxide on silica can also be prepared according to this invention.

Where the desired finished product has a metal rather than a metal oxide as its active material, as, for example, platinum on alumina (which is a known hydrogenation and hydrocracking catalyst) the metal compound (usually a metal oxide) obtained on drying and calcination is reduced to the free metal. Suitable reducing agents are known in the art.

The catalysts are sorbents prepared according to this invention are characterized by a substantially uniform depth of impregnation. This can be observed either visually or in an enlarged photograph or photomicrograph of a cross sectional cut when the active material and the carrier are of different colors. Small pore sorbents and those of moderate porosity, when prepared according to this invention, also have a sharp line of demarcation between the impregnated outer zone and the unimpregnated inner core. The sharpness of this line becomes less as the porosity of the carrier increases. Both the uniform depth of impregnation and the sharp boundary between the impregnated and unimpregnated portions of the particle can be confirmed by appropriate measuring instruments.

FIG. 1 is a copy of an electron probe tracing showing the variations in copper concentration (measured as percentage copper intensity) along a straight line extending from one edge to the opposite edge of a copper oxide on alumina saddle which was surface impregnated according to the present invention. The saddle was taken from a sorbent batch prepared as described in Example 15. The measuring instrument was a Cameca electron probe micron analyzer, model No. MS-64, manufactured by Acton Laboratories, Inc., Acton, Mass.

The sorbent sample was prepared for electron probe examination by breaking the saddle in two and mounting the segments in plastic with the interior surface up. The mounts were then ground and polished to reveal smooth, flat cross sections. A thin film of carbon was then evaporated onto the sample to provide a conductive layer necessary for preventing a charge build-up during the probe examination.

In electron probe analysis using the Cameca instrument, a fine electron beam less than one micron in diameter is focused onto the sample. The sample is then moved in a straight line under this beam at a selected speed, which can be varied from 12 to 2,000 microns per minute, depending on the resolution required. All of the electron beam scans in the examples herein were conducted at a scanning speed of 160 microns per minute. During the electron bombardment, X-rays characteristic of the elements present are emitted. These X-rays are then "sorted out" by the X-ray spectrometers and the intensities of the X-rays of the elements being determined are measured. The resulting intensity data are then recorded on a strip chart. The line scans so produced provide an analysis profile for each element being determined. Copper is the only element measured in the analyses shown in FIGS. 1 and 2. The analysis is independent of the state of chemical combination of the element being determined. Thus, copper of a given concentration (as Cu) would give the same intensity reading, whether that copper is present as metallic copper, copper oxide, copper sulfide, etc. In addition, the electron probe data are independent of the crystal structure of the species containing the element being determined. The intensity of the X-rays characteristic of copper (designated here as percent copper intensity and shown as the ordinates in FIGS. 1 and 2) is directly proportional to the copper concentration. The instrument has more than one scale, and the intensities scales are selected in accordance with the maximum concentration to be measured.

A detailed discussion of electron beam microanalysis is found in D. R. Beaman and J. A. Isasy, "Electron Beam Microanalysis", Special Technical Publication No. 506, American Society for Testing and Materials, 1916 Race St., Philadelphia, Pa. 19103 (1971). (See also Beaman and Isasy, "Electron Beam Microanalysis — Part I", *Materials Research and Standards*, Vol. II, No. 11, pp. 8–35 and 45–62, Nov. 1971).

As may be seen in FIG. 1, there was a measurable concentration of copper in a zone extending inwardly about 0.36–0.37 mm from each edge of the saddle, and substantially no copper in the interior of the saddle. It will also be observed that there is a very sharp boundary or line of demarcation between the impregnated outer zone of the saddle and the substantially unimpregnated interior. (A sharp line of demarcation between the impregnated outer zone and the unimpregnated interior is not always obtained using the techniques of this invention. The sharpness of the line of demarcation is a function of the pore size distribution of the particle; the greater the pore volume in larger size pores, the less sharp the line of demarcation tends to be.) The ordinate readings of approximately 10 to 15% of full scale along the portion of the lines representing the interior of the saddle represents random or background reading, rather than the presence of copper. It will be noted that there is also a small fluctuating ordinate reading (between 5 and 10% of full scale) beyond the edge of the saddle, as shown in the extreme right-hand portion of FIG. 1.

Figure 2:
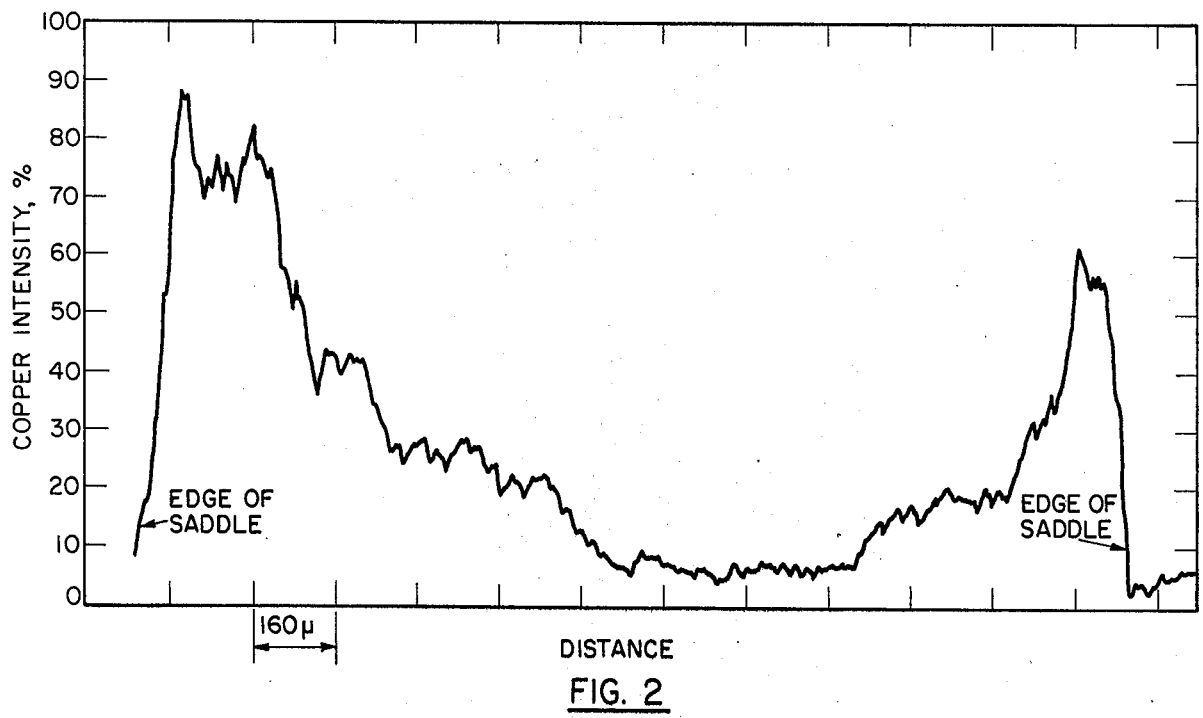
FIG. 2 is a copy of an electron probe tracing showing the variations in copper concentration along a straight line extending from one edge to the opposite edge of a surface-impregnated sorbent particle prepared by spray coating.

FIG. 2 is a graph showing the variations in copper concentration along a straight line in a cross-sectional cut of a copper on alumina saddle which was impregnated by spray coating, as described in detail in Example 15. The measuring instrument and technique was the same as those used in FIG. 1. The saddle in this case had a thickness of about 1.92 mm, which was slightly larger than its nominal thickness of 1/16 inch. It can be seen that there is no clear-cut line of demarcation between the impregnated outer zone and the unimpregnated inner core in this saddle. Instead, the copper concentration falls off more or less gradually from a maximum value close to the outer surface of the saddle to substantially zero in the interior of the saddle. Also, the maximum copper concentration and the depth of impregnation were both greater in the impregnated zone adjacent to the outer or convex surface of the saddle (left side in FIG. 2) than in the impregnated zone adjacent to the inner or concave surface of the saddle (right side in FIG. 2). In the saddle impregnated according to this invention (FIG. 1), on the other hand, a substantially uniform depth of impregnation was obtained and the copper concentration profiles in the zones adjacent to the two opposite edges (one convex, the other concave) of the saddle were very nearly the same.

The impregnation technique of the present invention is a simple method which gives a substantially uniform depth of impregnation with a high degree of uniformity from particle to particle, even in particles of irregular shape such as saddle and rings.

Catalysts and sorbents prepared as described above can be used in known catalytic, adsorption and cyclic chemical reaction processes. Flue gas desulfurization, which is the preferred process of this invention, falls into the third category.

Removal of sulfur dioxide from a waste gas, and subsequent regeneration of the sorbent, can be carried out using a sorbent as described above under known operating conditions. Thus, for example, flue gas containing a minor amount of sulfur dioxide (usually about 0.1–0.5% by volume of $SO_2$ and typically about 0.2–0.3% by volume of $SO_2$) plus some oxygen (usually about 1–4% by volume) is passed into contact with a fixed bed of the above-described surface impregnated sorbent at a space velocity of no more than about 10,000 v./v./hr., and usually about 1,000 to about 5,000 v./v./hr., and at a temperature which is appropriate to the particular sorbent material used. In the case of copper oxide on alumina sorbents, the inlet temperature of flue gas as it enters the bed is generally about 600°–900° F., preferably about 650°–800° F. Slightly higher inlet temperatures, e.g., about 700°–1000° F., may be used when the sorbent comprises potassium oxide and vanadium pentoxide on silica, which is another known flue gas desulfurization sorbent. These temperatures are typical flue gas desulfurization temperatures which are known in the art. The active material, e.g., copper oxide, reacts chemically with sulfur dioxide and oxygen. For instance, copper oxide is converted to copper sulfate. The passage of flue gas is stopped and the sorbent is regenerated when the amount of sulfur dioxide in the effluent reaches a predetermined level. For example, if it is desired to remove 90% of the amount of sulfur dioxide contained in a flue gas, the sorption or sulfation cycle is interrupted and the regeneration cycle is begun when the total amount of $SO_2$ in the effluent over a whole sorption cycle reaches 10% of the total amount of $SO_2$ in the entering gas.

The sorbents of this invention can be regenerated with known reducing agents and under known conditions. Suitable reducing agents include hydrogen, carbon monoxide, mixtures of these two, mixtures of either carbon monoxide or hydrogen (or both) with steam, and aliphatic hydrocarbons such as ethane, propane, or the like, either undiluted or mixed with steam. Methane is less desirable than its higher homologues because it is less reactive. In the case of a copper oxide on alumina sorbent, the copper sulfate and copper oxide present at the end of a sorption cycle are converted back to metallic copper when a strong reducing agent such as hydrogen is used, and to copper oxide (or a mixture of copper and copper oxide) when a milder reducing agent is used.

It is desirable to use regeneration temperatures which are approximately the same as the desulfurization temperatures, e.g. inlet temperatures, of about 600°–900° F. when a copper oxide sorbent is used. Since both desulfurization and regeneration are exothermic, sorbent bed temperatures are somewhat higher than gas inlet temperatures.

Sorbents prepared according to the present invention can withstand numerous sorption-regeneration cycles before they must be replaced. The surface impregnated sorbents of the present invention have several advantages over uniformly or totally impregnated sorbents which are more conventional in the flue gas desulfurization. A higher percentage of the copper is converted to copper sulfate in the surface impregnated sorbents herein than in the case of the fully impregnated sorbents of the art. An explanation for this is that sulfur dioxide, being present in low concentration in the flue gas, does not readily diffuse into the centers of sorbent particles, and instead breaks through into the effluent while a substantial quantity of copper oxide remains unconverted. This higher degree of sulfation in turn results in a larger amount of $SO_2$ desorbed per mole of reducing agent fed during regeneration. A further advantage of the sorbents of the present invention is that the exotherms during both sulfation and regeneration are less. This is due to a lower overall copper concentration. More efficient desulfurization is obtained using a surface impregnated sorbent of the present invention rather than a fully impregnated sorbent having the same overall copper concentration.

It has also been found that flue gas desulfurization proceeds more efficiently using a sorbent which is surface impregnated according to the techniques of the present invention, rather than being surface impregnated according to other techniques. For example, it is possible to obtain a surface coating of copper oxide on alumina by spraying alumina carrier particles with a controlled and limited quantity of impregnating solution containing a copper salt. However, the depth of penetration of the copper salt solution in that case is much less uniform than in the present case, and lower sulfations are obtained, all other factors being equal. Also, the technique will not give even coatings on the inside of such shapes as Raschig rings.

This invention will now be described further with respect to specific embodiments thereof as illustrated in the following examples.

EXAMPLE 1

This example shows the effect of impregnation time on the depth of penetration of the impregnating solution.

One-quarter inch cylindrical extrudates (length, one-fourth inch; diameter, one-fourth inch) of a porous alumina previously calcined for 3 hours at 1000° F. (BET surface area, 164 square meters per gram; pore volume, .39 cc per gram) were immersed in a mixture of isomeric $C_6$ alcohols ("oxo alcohols") for 1 hour. The extrudates were removed from the alcohol solution, drained of excess alcohol and were then immersed in a solution of aqueous copper nitrate containing about 0.7 grams of salt per cc of solution, for varying impregnation times. The extrudates were then removed from the copper nitrate solution, drained, blotted dry and dried in a forced air drying oven overnight at about 195° F. The extrudates were then sawed in half and the depth of impregnation was measured using a magnifying glass scribed with a scale in hundredths of inches. Data are shown in Table I below.

TABLE I

| Dip Time | Average Depth of Penetration Inches | Range, Inches | Copper, Wt. % |
|---|---|---|---|
| 1 Min. | .019 | .015–.025 | 1.1 |
| 2 Min. | .021 | .020–.025 | 1.1 |
| 5 Min. | .029 | .025–.030 | 1.9 |
| 10 Min. | .034 | .030–035 | 2.4 |

EXAMPLE 2

Saddles (length ⅜inch, width ⅜inch, thickness 1/16 inch) of a porous alumina previously calcined 3 hrs. at 1400° F. (BET surface area 180 m²/gram, pore volume 0.60 cc./gram) were immersed in pentanol-1 for 10 minutes. After removal, the saddles were dipped in a $Cu(NO_3)_2.3H_2O$ solution (.32 g./cc.) at (a) room temperature and (b) 0° C. for varying impregnation times. The saddles were then removed, drained, dried and calcined 3 hrs. at 800° F. The area percent impregnation was determined by making cross-sectional cuts of the samples, photographing the cross section of the saddle under an optical microscope (9X magnification) and measuring the unimpregnated area in the center of the saddle with the planimeter and dividing by the total saddle area. Data are given in Table II below.

TABLE II

| Dip Temp., °C. | 27 | | 0 | |
| --- | --- | --- | --- | --- |
| | Dip Time (min.) | Area % Impregnated | Dip Time (min.) | Area % Impregnated |
| | 1 | 29 | — | — |
| | 5 | 42 | 5 | 26 |
| | 10 | 55 | 10 | 34 |
| | 15 | 68 | 15 | 42 |

EXAMPLE 3

The procedure of Example 1 was repeated except that n-decyl alcohol was uses to presoak the extrudates. Data are given in Table III below.

TABLE III

| Dip Time | Average Depth of Penetration Inches* | Range, Inches |
| --- | --- | --- |
| 5 Min. | .015 | .010–.020 |
| 10 Min. | .024 | .020–.030 |
| 15 Min. | .031 | .024–.040 |

*Average of 10 measurements.

As can been seen from Examples 1–3, the depth of impregnation can be controlled by (a) varying the temperature and time of the dip or (b) by varying the alcohol used. By proper use of these variables, it is possible to exercise some control over the depth of impregnation.

EXAMPLE 4

The procedure of Example 1 was followed except that acetonitrile, hexanenitrile and adiponitrile were used as the presoak liquids, and the extrudates were oven dried following the presoak and prior to impregnation with copper nitrate. Results are given in Table IV.

TABLE IV

| Presoak Liquid | Dip Time, Minutes | Penetration Inches |
| --- | --- | --- |
| Acetonitrile | 1 | .015 |
| | 5 | .025 |
| | 10 | .033 |
| Hexane nitrile | 1 | .025 |
| | 5 | .047 |
| | 10 | .054 |
| Adiponitrile | 2 | .020 |
| | 5 | 0.27 |
| | 10 | .034 |

This example shows that nitriles may be used; however, acetonitrile is water soluble; hexane nitrile is displaced too rapidly for good control of penetration, and removal of adiponitrile in the drying and calcining steps might pose problems.

EXAMPLE 5

The procedure of Example 1 was followed except that acetone, methyl ethyl ketone and hexanone-2 were used to presoak the extrudates. Data are shown in Table V below.

TABLE V

| Presoak Liquid | Dip Time, Minutes | Penetration, Inches |
| --- | --- | --- |
| Acetone | 1 | .017 |
| | 5 | .024 |
| | 10 | .033 |
| Methyl Ethyl Ketone | 1 | .015 |
| | 5 | .025 |
| | 10 | .040 |
| Hexanone-2 | 1 | .011 |
| | 5 | .026 |
| | 10* | .041 |

*Irregular penetration noted.

This example shows that ketones may be used as presoaking liquids, however, acetone and methyl ethyl ketone have the disadvantages of high volatility and are water miscible; hexanone-2 gave irregular penetration of the sorbent.

EXAMPLE 6

The procedure of Example 1 was repeated except that ethyl acetate was used to presoak the extrudates. Very uniform impregnation of the carrier was observed. Thus, ethyl acetate is an excellent presoak liquid. Data are given in Table VI below.

TABLE VI

| Dip Time | Average Depth of Penetration, Inches* |
| --- | --- |
| 1 Min. | .023 |
| 3 Min. | .031 |
| 5 Min. | .038 |
| 10 Min. | .050 |

*Very uniform impregnation of extrudates observed.

EXAMPLE 7

The procedure of Example 1 was followed except that propional, 2-ethylhexanal and furfural were used to presoak the extrudates. Results are shown in Table VII below.

TABLE VII

| Presoak Liquid | Dip Time, Minutes | Penetration, Inches |
| --- | --- | --- |
| Propional | 1 | .010 |
| | 5 | .023 |
| | 10 | .027 |
| Furfural | 1 | .010 |
| | 5 | .012 |
| | 10 | .019 |
| 2-ethylhexanal* | 1 | 0.000 |
| | 3 | .005 |
| | 10 | .015 |

*Irregular penetration and blotchiness observed.

The above data show that aldehydes will function as a presoak liquid; however, aldehydes are reactive (easily oxidized to acid) an unsaturated aldehydes such as furfural might be expected to form resinous compounds difficult to remove from the sorbent. (Note: with furfural this was observed.) Because of their reactivity and easy conversion to acids (poor presoaking liquids) aldehydes as a class would not be preferred.

EXAMPLE 8

This example compares the results obtained using n-butanol and tertiary butanol. The former is a primary alcohol and the latter is a tertiary alcohol; n-butanol is partially miscible with water, but t-butanol is miscible in all proportions. Results are shown in Table VIII below.

TABLE VIII

| Dip Time | Penetration, Inches | |
| --- | --- | --- |
| | n-butanol | tert.-butanol |
| 1 Min. | .014 | .005 |
| 3 Min. | .021 | .010 |
| 5 Min. | .028 | .010 |

Considerably faster penetration was obtained with n-butanol than with tert.-butanol as the above Table VIII shows.

EXAMPLE 9

This example is included to show that benzene is not a suitable presoak liquid.

The procedure was the same as in Example 1 except that benzene was used as the presoak liquid. Results are shown in Table IX below.

TABLE IX

| Dip Time | Average Depth of Penetration, Inches |
| --- | --- |
| 1 Min. | .039 |
| 3 Min. | .058 |
| 5 Min. | .075 |
| 10 Min. | .120 |

The above data show that the displacement rate of benzene is entirely too fast for practical surface coating of alumina.

EXAMPLE 10

This example compares results obtained with acetic acid (water soluble) with octanoic acid. The procedure was the same as in Example 1, except that acetic and octanoic acids were used to presoak the extrudates.

TABLE X

| Presoak Liquid | Dip Time, Minutes | Penetration, Inches |
| --- | --- | --- |
| Acetic Acid | 1 | .005 |
| | 5 | .015 |
| | 10 | .019 |
| 1-Octanoic Acid | 5 | No penetration |
| | 15 | No penetration |

As can be seen, acetic acid works very well as a presoak liquid, the only drawback being that it is miscible with water. Higher organic acids such as octanoic are not usable as presoak liquids.

EXAMPLE 11

In this example, the use of low molecular weight water miscible alcohols and glycols as presoak liquids is demonstrated. The procedure of Example 1 was followed using methanol, ethanol, isopropanol and ethylene glycol as presoak liquids. Data are shown in Table XI below.

TABLE XI

| Presoak Liquid | Dip Time, Minutes | Penetration, Inches |
| --- | --- | --- |
| Methanol | 1 | .018 |
| | 5 | .030 |
| | 10 | .043 |
| Ethanol | 1 | .012 |
| | 5 | .021 |
| | 10 | .025 |
| Isopropanol | 1 | .010 |
| | 5 | .016 |
| | 10 | .020 |
| Ethylene Glycol | 1 | .020 |
| | 5 | .027 |
| | 10 | .042 |

All of the above could function as presoak liquids with isopropanol giving the best control. Methanol suffers from high volatility which could give problems in the drying step. All of the above compounds are water miscible which is a disadvantage if recycling of the impregnating solution is used. For once-through operations, isopropanol would be an excellent presoak liquid.

EXAMPLE 12

This example illustrates extension of the displacement technique to a different sorbent base and illustrates that hydrocarbons are not practical as presoak liquids because of their extremely rapid displacement.

One quarter inch extrudates of a 90% $Al_2O_3$–10% silica sorbent base were calcined for 3 hours at 1000° F. (BET S.A. = 245 m$^2$/g., PV = 0.45 cc./g.). The extrudates were immersed in the presoak liquid for 1 hour, removed from the presoak liquid, drained and immersed in a solution of aqueous copper nitrate containing about 0.7 g. of salt per cc. of solution for varying impregnation times. The extrudates were then removed from the copper nitrate solution, drained, blotted and dried in a forced air drying over overnight at about 195° F. The extrudates were then sawed in half and the depth of impregnation measured using a magnifying glass scribed with a scale in hundredths of an inch. Data are shown in Table XII.

TABLE XII

| Presoak Liquid | Dip Time, Minutes | Penetration, Inches |
| --- | --- | --- |
| Hexane | 1 | .070 |
| | 5 | .090 |
| | 10 | Complete |
| Benzene | 1 | .040 |
| | 5 | .090 |
| | 10 | Complete |
| Mesitylene | 1 | .040 |
| | 5 | .090 |
| | 10 | Complete |
| Amyl Alcohol | 2 | .020 |
| | 5 | .030 |
| | 10 | .040 |
| Hexyl Alcohol | 1 | .005 |
| | 5 | .020 |
| | 10 | .025 |

Above data show the extremely rapid displacement of the hydrocarbons (hexane, benzene, and mesitylene), all of which are completely impregnated in somewhat less than 10 minutes) and the much more controlled rate of displacement of the amyl and hexyl alcohols.

EXAMPLE 13

This example compares the effectiveness of two copper oxide on alumina sorbents as flue gas disulfurization sorbents. One sorbent was surface impregnated according to the present invention; the other was totally impregnated according to conventional procedures. Both were prepared from the same alumina carrier material.

The carrier material used in the preparation of both surface impregnated Sorbent A and totally impregnated Sorbent B in this example was calcined alumina saddles having the shape shown in FIGS. 2-4 of U.S. Pat. No. 3,060,503. The calcined alumina saddles have a surface area (BET) of 203 square meters per gram, and a pore volume of 0.57 cc per gram.

A quantity of the above saddles was divided into three batches, each of which was soaked in pentanol-1 for 10 min., removed from the presoak liquid, blotted on paper towels and impreganted with aqueous copper nitrate solution containing 700 grams of $Cu(NO_3)_2.3H_2O$ per liter of solution. The dip time in the impregnating solution was varied as shown below:

| Batch | A-1 | A-2 | A-3 |
|---|---|---|---|
| Dip Time (Min.) | 12 | 6.5 | 1.5 |

After removal from the impregnating solution, the three batches of sorbent were dried at 190° F. over a weekend, then calcined for 3 hours at 800° F. Cross sectional cuts of several of the saddles were made and the cross sectional area of the unimpregnated portion determined by a planimeter. The area % impregnation was thus determined and the copper content determined by analyses. Data are summarized below:

| Batch | A-1 | A-2 | A-3 |
|---|---|---|---|
| Vol. % Impregnation | 60 | 62 | 48 |
| Cu, Wt. % | 4.3 | 3.7 | 2.2 |

All three batches of above sorbent were designated as Sorbent A.

A second quantity of the unimpregnated alumina saddles was divided into three approximately equal batches. Each batch was impregnated with aqueous $Cu(NO_3)_2.3H_2O$ without prior presoaking as shown below:

| Batch | B-1 | B-2 | B-3 |
|---|---|---|---|
| Wt. Dry $Al_2O_3$, g. | 287.63 | 291.98 | 279.64 |
| $Cu(NO_3)$ Soln., g./cc. | .32 | .24 | .16 |
| cc. $Cu(NO_3)_2$ Solution Used | 162 | 164 | 157 |

After impregnation, the sorbents were calcined for 3 hours at 800° F. and analyzed for copper.

| Batch | B-1 | B-2 | B-3 |
|---|---|---|---|
| Wt. & Cu | 4.2 | 3.0 | 1.6 |

All three batches of above sorbent were designated Sorbent B.

Sorbents A and B were tested in separate runs using the same reactor under substantially identical conditions. The reactor was a vertical tubular reactor having a 3 inch inside diameter and a length of 26 inches, exclusive of the tapered end sections which were connected to 1-½ inch diameter headers. The reactor contained a packed bed of impregnated sorbent approximately 18 inches deep, with inert packing both above and below the sorbent bed, in both runs. The packed bed contained Sorbent A saddles in Run A, and Sorbent B saddles in Run B. The sorbents (A & B) in each run were charged to the reactor using a decreasing copper gradient, i.e. the batch with the lowest copper content at bottom and the batch with the highest copper content on top. Synthetic flue gas containing approximately 0.27% by volume of $SO_2$ and 2.5% by volume of oxygen, balance mostly nitrogen, was used in both runs. The sorbents in both runs were subjected to repeated alternate sulfation and regeneration cycles. During the sulfation cycles, the flue gas was passed downwardly through the reactor at an inlet temperature of about 650° F. and a space velocity of about 2500 v./v./hr. Flow of the flue gas was discontinued when the amount of $SO_2$ in the total reactor effluent for one complete cycle reached 10% of the total amount of $SO_2$ in the incoming flue gas. Regeneration was carried out by passing a mixture of 60% by volume of steam and 40% by volume of hydrogen downwardly through the reactor. In both runs, the copper utilization, i.e., the percentage of copper converted to copper sulfate, was less than 100%; however, the percentage copper utilization was better in the case of the surface impregnated Sorbent A than in the case of the totally impregnated Sorbent B. Results are shown in Table XIII below.

TABLE XIII

| Run No. | Impregnation | % Cu Utilization at 90% $SO_2$ Removed |
|---|---|---|
| A | Surface | 20 |
| B | Total | 16 |

EXAMPLE 14

This example illustrates the use of a metal salt other than copper.

Thirty grams of Harshaw $Al_2O_3$ ⅛ inch extrudates (BET surface area 190 m²/g. P.V. .65 cc/g.) after calcining for 3 hours at 800° F. were presoaked for 1 hour in hexyl alcohol. The extrudates were removed from the alcohol solution, drained and dipped in an aqueous solution of $Fe(NO_3)_3.9H_2O$ (0.60 g. salt/cc. solution) for two minutes. After removal from the impregnating solution, the extrudates were dried overnight at 195° F. and then calcined for 3 hours at 800° F. Some of the extrudates were broken open and the depth of penetration measured as described in Examples 11 and 12. The average depth of penetration was found to be 0.010 inch. The impregnated portion was reddish brown in color and the unimpregnated center was white.

The iron oxide in the impregnated portion can be reduced to metallic iron with hydrogen gas at elevated temperatures. The resulting material is useful as a hydrogenation catalyst.

EXAMPLE 15

This example shows that more efficient utilization of copper is obtained in surface impregnated sorbents prepared by the present method than in surface impregnated sorbents which are prepared by spray coating with impregating solution without prior presoaking.

The carrier used in preparing the sorbents for both Runs C and D in this example was alumina in the shapes shown in FIGS. 2-4 of U.S. Pat. No. 3,060,503. These saddles have the approximate dimensions of ¾ inch long overall × ⅜ inch wide × 1/16 inch thick. The surface area of the calcined saddles was 178 square meters per gram, and the pore volume was 0.63 cc/gram. These saddles contained 7% by weight of organic fibers prior to calcination; this imparted macroporosity to the calcined material.

Sorbent C, which was used in Run C, was prepared as follows: A 3 liter batch of the above-described saddles was divided into three equal portions. Each portion was immersed in a beaker containing 1-pentanol for 10 minutes, so that the saddles became completely saturated with pentanol. The excess 1-pentanol from the saturated saddles was decanted, and each batch of saddles was transferred from the original beaker to a second 1 liter beaker. An impregnating solution was prepared by dissolving 2065.5 grams of $Cu(NO_3)_2.3H_2O$ in enough deionized water to make 3000 cc of solution. About 1 liter of this impregnating solution was poured into each of the three beakers containing the presoaked saddles. Thus, the saddles in each of the three beakers was immersed in the impregnating solution. The three batches remained immersed for 12, 6.5 and 1.5 minutes, respectively. Immersion times were measured from the onset of pouring to the start of decantation. After decanting the excess liquid, the impregnated saddles were blotted on paper towels and then placed immediately in a drying oven held at 200° F. After drying, the sorbents were calcined for 1 hour at 300° F., then 1 hour at 500° F., then 3 hours at 800° F. During this calcination the copper nitrate was decomposed to copper oxide. Data for the three batches of calcined and impregnated samples which together constituted Sorbent C are shown in Table XIV below.

TABLE XIV

| Batch | Impregnation Time, Min. | Wt. % Cu Target | Wt. % Cu Actual | Area % Impregnation Target | Area % Impregnation Actual* |
|---|---|---|---|---|---|
| C-1 | 12 | 3.0 | 3.1 | 60 | 57 |
| C-2 | 6.5 | 2.25 | 2.4 | 45 | 49 |
| C-3 | 1.5 | 1.5 | 1.9 | 30 | 44 |

*Average of 5 samples.

The actual area impregnation in Table XIV was determined by making cross-sectional cuts of five samples in each batch, photographing the cross-section of the saddle under an optical microscope (9X magnification), measuring the unimpregnated area in the center of the saddle with the planimeter, and dividing by the total saddle area. The actual percentage of copper in Table XIV indicates that experimental values are closer to the nominal values than the visually measured volume percentage penetration indicates.

The saddles for sorbent D were calcined for 3 hours at 1400° F. (BET surface area = 170 sq. meters/gram; pore volume = .58 cc./gram). These saddles contained 28% cornstarch prior to calcination to impart increased macroporosity to the calcined material.

Sorbent D, which was used in Run D, was prepared as follows: The sorbent was divided into three batches (approximately 350 g./batch). A stock solution of $Cu(NO_3)_2.3H_2O$ was made up containing 0.75 grams of salt/cc. of solution. Each batch of saddles was then placed on a tray with a wire mesh bottom and spray coated with the $Cu(NO_3)_2$ solution. Rapid movement of the tray during spraying was employed in order to provide as uniform a coating as possible. The amounts of solution used were varied for each batch so as to give varying degrees of penetration (target 60%, 45% and 30% impregnation). Data are shown below:

TABLE XV

| Batch | D-1 | D-2 | D-3 |
|---|---|---|---|
| Ml. $Cu(NO_3)_2$ Solution Used* | 58 | 43 | 29 |
| Vol. % Imp. Target | 60 | 45 | 30 |
| Vol. % Imp. Found | 61 | 39 | 34 |

TABLE XV-continued

| Batch | D-1 | D-2 | D-3 |
|---|---|---|---|
| Wt. % Cu** | 3.0 | 2.7 | 1.5 |

*Approximately 10 percent excess solution used.
**Copper values on calcined sample.

The saddles after spray coating were dried overnight in a forced air oven at 190° F. and then calcined 3 hours at 800° F.

Sorbents C and D were separately evaluated as flue gas desulfurization sorbents in Runs C and D, respectively. The vertical tubular reactor described in Example 13 was used in both Runs C and D. In each case, the reactor contained a fixed packed bed of the impregnated sorbents, approximately 18 inches deep, with inert packing (unimpregnated saddles) both above and below the packed bed. In charging the reactor as in the previous example, a decreasing copper gradient was used; thus, approximately equal amounts of each sorbent sub-batches were charged with the highest copper content at the top and the lowest copper content sorbent at the bottom. The sorbents in both runs were subjected to repeated alternate sulfation and regeneration cycles, using synthetic flue gas (0.27% by volume $SO_2$, 2.5% by volume oxygen, balance nitrogen) at an inlet temperature of 650° F. and a space velocity of 2000 v./v./hr. in both runs. Copper utilization, i.e., the percentage of copper in the sorbent which was converted to copper sulfate during the sorption cycle, is indicated in Table XVI below.

TABLE XVI

| Run | Impregnation Technique | Average Wt. %. Cu* | % Cu Utilization |
|---|---|---|---|
| C | Displacement | 2.5 | 26.5 |
| D | Spray Coating | 2.4 | 21.5 |

*Average copper value for each bed.

The above table shows that more efficient utilization of copper was obtained in the sorbent prepared by the displacement technique according to the present invention than in the spray coated Sorbent D.

EXAMPLE 16

This example describes the electron probe examinations of sorbent samples taken from sorbent C and sorbent D as described in Example 15.

The sorbent samples were prepared for electron probe examination by breaking the saddles in two and mounting the segments in plastic with the interior surfaces up. The mounts are then ground and polished to reveal smooth, flat cross-sections. A thin film of carbon was then evaporated onto each sample to provide a conductive layer necessary for preventing a charge build-up during the probe examination.

The electron probe analyses were conducted using a Cameca electron probe micro analyzer, Model MS64, manufactured by Acton Laboratories, Inc., Acton, Mass. In electron probe analysis, a fine electron beam, less than one micron in diameter, is focused onto each sample. The sample was then moved in a straight line under this beam at a speed of 160 microns per minute (The scanning speed can be varied from 12 microns per minute to 2000 microns per minute, depending on the resolution required). During electron bombardment, x-ray characteristics of copper were emitted. These x-rays are then "sorted out" by x-ray spectrometers and the intensities of the x-rays of the elements being determined (in this case copper) are measured. The resulting intensity data were then recorded on a strip chart. This strip chart is reproduced as FIG. 1. The line scan so produced provides an analysis profile for copper. This analysis is independent of the state of combination of the copper, whether as oxide, free metal, etc. The analysis is also independent of the crystal structure of the species containing the copper.

FIG. 2 is an electron micro probe analysis profile of a spray coated alumina saddle, sorbent D, prepared as described in Example 15.

In FIG. 1 it will be noted that there is a sharp boundary between the copper-impregnated outer portion and the unimpregnated alumina interior of the saddle. It will be noted that there is no sharp interface between the impregnated outer portion and the interior of the saddle depicted in FIG. 2.

This example illustrates that the displacement technique is capable of producing uniform, controlled impregnations of sorbent or catalyst supports. The displacement technique is especially suitable for support shapes such as rings which are not amenable to uniform impregnation by spray coating. It will also be noted in Example 15 that sorbent C, which is prepared by the displacement technique according to this invention, gave significantly better copper utilizations than did sorbent D, which was impregnated by spray coating, in flue gas desulfurization tests run under identical conditions.

What is claimed is:

1. In a process for removing sulfur dioxide from a gaseous mixture containing the same wherein said gaseous mixture is contacted with a sorbent under desulfurizing conditions, said sorbent comprising a porous, solid inorganic hydrophilic carrier and an active material for the selective removal of $SO_2$, the improvement wherein said active material is deposited predominantly in an outer zone adjacent to the external surface of said carrier and wherein said sorbent is prepared by:
   a. immersing the porous solid inorganic hydrophilic carrier material in a polar organic presoak liquid such that said presoak liquid substantially completely fills the pores of the carrier material, said presoak liquid being capable of (1) wetting said carrier material and (2) displacement by the impregnating solution used in (b) at a rate slow enough to permit control of the depth of impregnation; and
   b. separating the carrier material from the presoak liquid and, without substantial removal of presoak liquid from the pores of said carrier material, immersing the separated carrier material in an impregating solution containing a compound which is decomposable into the desired active material for a time sufficient to permit the impregnating solution to displace a portion of the presoak liquid and thereby penetrate the carrier material to a controlled depth, the depth of penetration being controlled by the time during which said separated carrier material is immersed in said impregnating solution at any given set of impregnating conditions.

2. The improvement of claim 1 wherein the active material is copper oxide and the solid, porous inorganic hydrophilic carrier is alumina.

3. The improvement of claim 1 wherein said presoak liquid comprises one or more aliphatic monohydric alcohols containing from about 4 to about 12 carbon atoms.

4. The improvement of claim 3 wherein said presoak liquid is a mixture composed predominantly of primary aliphatic monohydric alcohols containing 5 to 10 carbon atoms.

5. The improvement of claim 3 wherein said presoak liquid is pentanol-1.

6. The improvement of claim 1 wherein said presoak liquid is isopropanol.

7. The improvement of claim 3 wherein the active material is copper oxide and the solid, porous inorganic hydrophilic carrier is alumina.

* * * * *